US009397729B2

(12) United States Patent
Yeh et al.

(10) Patent No.: US 9,397,729 B2
(45) Date of Patent: Jul. 19, 2016

(54) THROUGH CHIP COUPLING FOR SIGNAL TRANSPORT

(75) Inventors: Tzu-Jin Yeh, Hsinchu (TW); Hsieh-Hung Hsieh, Taipei (TW); Jun-De Jin, Hsinchu (TW); Ming Hsien Tsai, Sindian (TW); Chewn-Pu Jou, Hsinchu (TW); Fu-Lung Hsueh, Cranbury, NJ (US)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 399 days.

(21) Appl. No.: 12/946,072

(22) Filed: Nov. 15, 2010

(65) Prior Publication Data

US 2012/0122395 A1 May 17, 2012

(51) Int. Cl.
*H04B 5/00* (2006.01)

(52) U.S. Cl.
CPC ................................ *H04B 5/0081* (2013.01)

(58) Field of Classification Search
CPC ... H04B 5/0081; H04B 5/0087; H04B 5/0093
USPC .............................. 455/41.1, 78–83, 121–123, 455/193.1–193.3, 274, 279.1, 286; 340/10.1
See application file for complete search history.

(56) References Cited

U.S. PATENT DOCUMENTS

| 5,455,466 | A | | 10/1995 | Parks et al. | |
|---|---|---|---|---|---|
| 5,754,948 | A | * | 5/1998 | Metze | 455/41.2 |
| 6,009,314 | A | * | 12/1999 | Bjork et al. | 455/83 |
| 6,329,808 | B1 | | 12/2001 | Enguent | |
| 6,415,134 | B1 | * | 7/2002 | Merlin | 455/41.1 |
| 6,927,647 | B2 | * | 8/2005 | Starri et al. | 333/103 |
| 6,942,157 | B2 | * | 9/2005 | Nozawa et al. | 235/492 |
| 7,050,763 | B2 | * | 5/2006 | Stengel et al. | 455/90.3 |
| 7,199,679 | B2 | * | 4/2007 | Mondal | 333/25 |
| 7,538,741 | B2 | * | 5/2009 | Castaneda et al. | 343/859 |
| 7,617,342 | B2 | * | 11/2009 | Rofougaran | 710/100 |
| 7,933,573 | B2 | * | 4/2011 | Kondo et al. | 455/161.2 |
| 7,995,604 | B2 | * | 8/2011 | Rofougaran | 370/445 |
| 8,023,893 | B2 | * | 9/2011 | Richman | 455/41.2 |
| 8,076,996 | B2 | * | 12/2011 | Lee et al. | 333/117 |
| 8,686,685 | B2 | * | 4/2014 | Moshfeghi | 320/108 |
| 8,712,323 | B2 | * | 4/2014 | Pahlavan et al. | 455/41.1 |
| 2005/0215205 | A1 | * | 9/2005 | Rofougaran | 455/78 |
| 2007/0015485 | A1 | * | 1/2007 | DeBiasio et al. | 455/345 |
| 2008/0245851 | A1 | * | 10/2008 | Kowalski | 235/375 |
| 2010/0069000 | A1 | * | 3/2010 | Nakagawa | 455/41.1 |
| 2011/0250838 | A1 | * | 10/2011 | Alexopoulos et al. | 455/41.1 |
| 2011/0287715 | A1 | * | 11/2011 | Matsuura et al. | 455/41.1 |
| 2012/0034869 | A1 | * | 2/2012 | Rofougaran | 455/41.1 |
| 2012/0062358 | A1 | * | 3/2012 | Nowottnick | 340/5.2 |
| 2012/0077447 | A1 | * | 3/2012 | Rofougaran | 455/73 |
| 2012/0169472 | A1 | * | 7/2012 | Ikemoto | 340/10.1 |
| 2012/0182127 | A1 | * | 7/2012 | Rofougaran et al. | 340/10.1 |
| 2013/0029598 | A1 | * | 1/2013 | Rofougaran | 455/41.1 |
| 2013/0260708 | A1 | * | 10/2013 | Rofougaran | 455/280 |
| 2014/0134950 | A1 | * | 5/2014 | Leedy | 455/41.2 |

\* cited by examiner

*Primary Examiner* — Simon Nguyen
(74) *Attorney, Agent, or Firm* — Hauptman Ham, LLP

(57) ABSTRACT

Through-chip coupling is utilized for signal transport, where an interface is formed between a first coil on a first integrated circuit (IC) chip and a second coil on a second IC chip. The first coil is coupled to an antenna. The second coil is coupled to an amplifier circuit. The second coil is not in direct contact with the first coil. The first coil and the second coil communicatively transmit signals between the antenna and the first amplifier circuit.

22 Claims, 5 Drawing Sheets

THROUGH CHIP COUPLING FOR SIGNAL TRANSPORT

BACKGROUND

Whether used for transmitting signals, receiving signals, or both, antennas for radio frequency (RF) applications are connected to front-end circuitry. For example, a transmitting RF antenna is typically connected with a power amplifier. Usually, the power amplifier receives signals that have been manipulated, such as through a mixer receiving both an intermediate frequency/automatic gain control (IF/AGC) signal and a local oscillation (LO) signal. Conversely, a receiving RF antenna is connected to a low noise amplifier (LNA). The signal received by the antenna is supplied to the LNA, which in turn is mixed with an LO signal to form an IF/AGC signal for further baseband demodulation/decoding. In applications where both functions are needed, such as cellular telephony, transceivers perform both functions with some overlap of circuitry.

The circuitry for an antenna can often be placed on a different integrated circuit (IC) chip than the front end circuitry to which it is attached. Prior approaches known to the inventors to connect antennas and front end circuitry include various wired or direct connection methods. For example, bonding wires can be used to connect one chip to another. Likewise, micro-bump connections can be used, in which small solder contacts on each chip come into direct contact to make a connection. Through silicon vias (TSVs) can also be used to connect the RF components to an antenna. Using this approach, a conducting material is formed in a column between vertically arranged chips. However, each of these solutions raise the cost, present concerns with regard to impedance matching and electrostatic discharge (ESD) protection, and drop the yield during manufacturing. These solutions also increase the complexity of packages that enable the connection between antennas and RF transmission and recovery signals.

BRIEF DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figure 1:
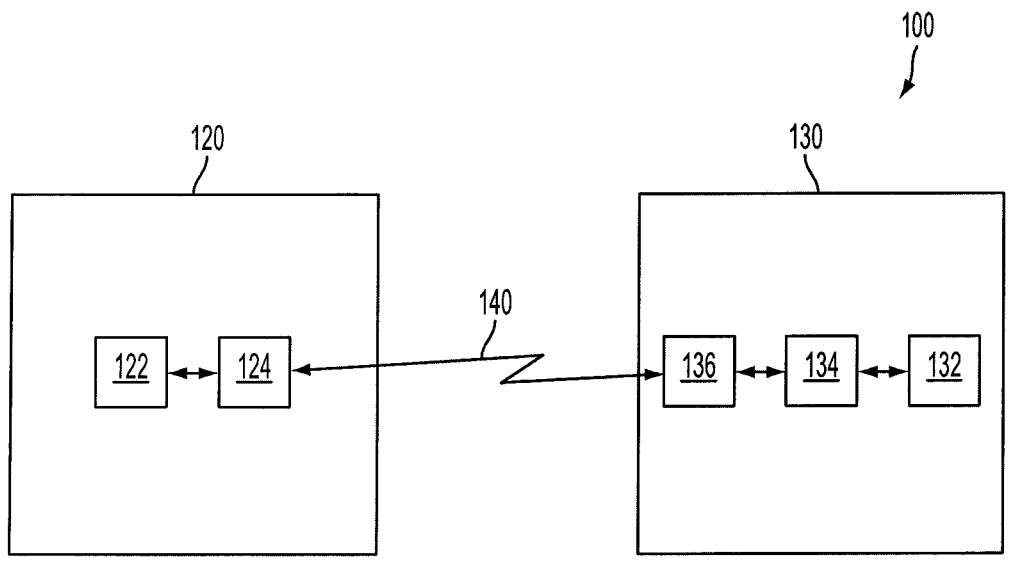
FIG. 1 is a block diagram representing functional components of a transmitting system utilizing through-chip coupling according to embodiments of the invention.

The below descriptions describe embodiments of systems and methods for through-chip coupling for signal transport in integrated circuits. The use of "an embodiment" or "one embodiment" is not intended to convey that the descriptions pertain to a single embodiment, but that the features described are present in at least one implementation. Like features will generally be referred to with like reference numerals, but this is also not intended to denote a requirement that the same features appear in each embodiment. Also, features depicted in the figures are not drawn to scale and therefore should not be construed to place particular size limitations on the systems described.

FIG. 1 is a block diagram representing functional components of a transmitting system 100 utilizing through-chip coupling according to embodiments of the invention. Transmitting system 100 comprises a first integrated circuit (IC) chip 120. In some embodiments, first IC chip 120 is a silicon-based integrated circuit chip. In other embodiments chip 120 is constructed using different materials, such as silicon on sapphire, Germanium (Ge), Si—Ge, Gallium Arsenide (GaAs), other suitable materials, or combinations thereof. Operational frequencies of the circuits described below, layout constraints, or other manufacturing considerations may make the selection of one or more materials preferable over another. The selection of a particular material or type of IC should not be construed as limiting the disclosed embodiments.

Chip 120 includes a transmission module 122, which is configured to transmit signals utilizing active and/or passive circuitry and components. Exemplary circuits and/or components are power amplifiers, mixers, frequency converters, oscillators, controls, or feedback circuits. In at least one embodiment, a power amplifier receives a signal from a mixer, which in turn receives input from a local oscillation (LO) circuit and an automatic gain control circuit. In various embodiments, operational amplifiers, transistors, diodes, switches, resistors, capacitors, inductors, and/or other elements are utilized to construct the aforementioned circuits and components. Transmission module 122 is coupled to a first through-chip coupling coil 124.

Transmitting system 100 also comprises a second IC chip 130. Second chip 130 can also be a silicon-based chip in some embodiments. Alternate embodiments use different materials, such as silicon on sapphire, germanium (Ge), Si—Ge, gallium arsenide (GaAs), other suitable materials, or combinations thereof. In one embodiment, second chip 130 is the same material as first chip 120 (e.g., silicon). Other embodiments utilize different materials for chips 120 and 130.

FIG. 1 depicts an antenna 132, a band-pass filter (BPF) 134, and a second through-chip coupling coil 136, each part of second chip 130. Second through-chip coupling coil 136 communicates wirelessly with first through-chip coupling coil 124 as denoted by transmission 140. Second through-chip coupling coil 136 communicates signals received to band-pass filter 134, which then filters the signals to be transmitted. Antenna 132 transmits the filtered signals upon receiving the signals from BPF 134. Second chip 130 should not be construed as limited to these components, as other components may or may not be included.

Figure 2:
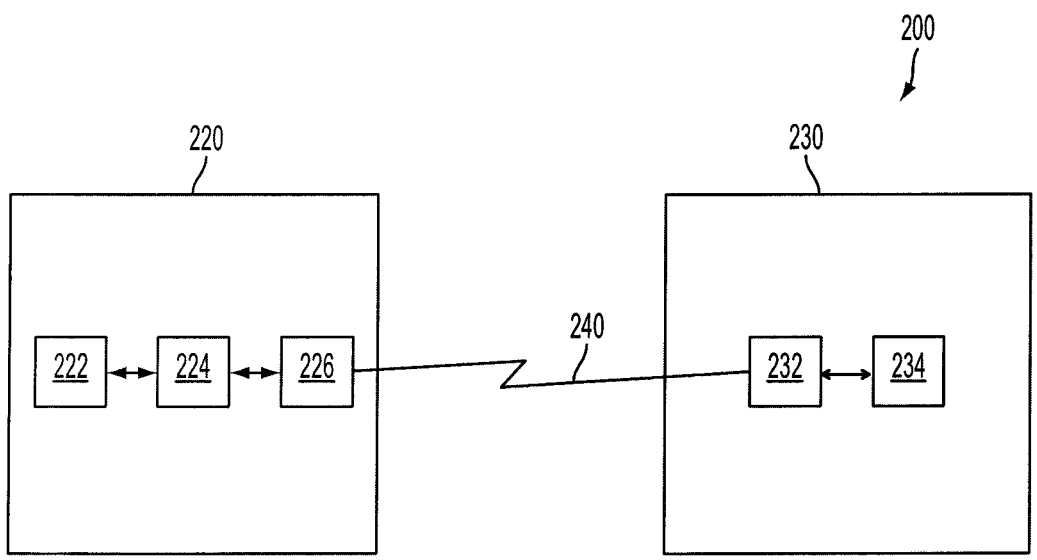
FIG. 2 is a block diagram representing functional components of a receiving system utilizing through-chip coupling according to embodiments of the invention.

FIG. 2 is a block diagram representing functional components of a receiving system 200 utilizing through-chip coupling according to embodiments of the invention. Receiving system 200 comprises a first IC chip 220. First chip 220 is a silicon-based chip in the depicted embodiment. Alternate embodiments use materials such as silicon on sapphire, germanium (Ge), Si—Ge, gallium arsenide (GaAs), other suitable materials, or combinations thereof.

First chip 220 has blocks representing an antenna 222, a band-pass filter (BPF) 224, and a first through-chip coupling coil 226 as components. Antenna 222 receives signals and communicates them to BPF 224 for filtering. BPF 224 communicates filtered signals to first through-chip coupling coil 226.

Receiving system 200 also comprises a second integrated circuit (IC) chip 230. In some embodiments, second IC chip 230 is a silicon-based integrated circuit chip, such as depicted in the block diagram of FIG. 2. In other embodiments, chip 230 is constructed using different materials, such as silicon on sapphire, germanium (Ge), Si—Ge, gallium arsenide (GaAs), other suitable materials, or combinations thereof. Again, operational frequencies, layout constraints, or other manufacturing considerations may make the selection of one or more materials preferable over another and should not be considered limiting.

First through-chip coupling coil 226 wirelessly supplies the filtered signals to a second through-chip coupling coil 232 as denoted by transmission 240. Second through-chip coupling coil 232 communicates signals received to reception module 234. Reception module 234 utilizes active and/or passive circuitry and components, such as low noise amplifiers, mixers, frequency converters, oscillators, controls, and feedback circuits. In at least one embodiment, a low noise amplifier receives a signal from the through-chip coupling coil and supplies the signal and input from a local oscillation (LO) circuit to a mixer. The mixer in turn supplies the mixed signal to an automatic gain control circuit. In various embodiments, operational amplifiers, transistors, diodes, switches, resistors, capacitors, inductors, and other elements are utilized to construct the aforementioned circuits and components.

Systems 100 and 200 include a number of desirable features over other systems known to the inventors. Because the data communication is wireless, protection against electrostatic discharge (ESD) is advantageously not needed. Chip area is advantageously saved with the elimination of the features to protect against ESD, and because complex circuits for digital processing are not needed. Processes to make direct connections such as solder bumps, wiring, or TSVs are also eliminated. Testing may be accomplished wirelessly, as well. The increasing coupling factor that accompanies increasing operational frequencies also means that the disclosed embodiments are suitable for applications including millimeter wave applications, such as RF silicon-in-package (SiP) or three-dimensional (3D) IC packages.

Figure 3:
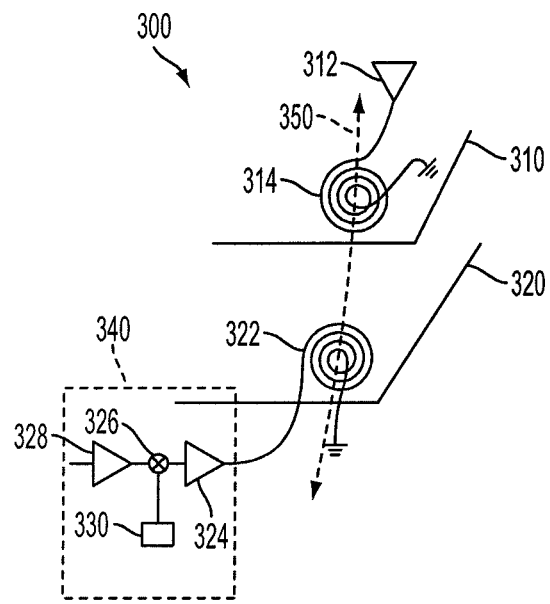
FIG. 3 is a perspective, cross-sectional view of a system for transmitting signals utilizing through-chip coupling according to embodiments of the invention.

FIG. 3 is a perspective, cross-sectional view of a transmission system 300 for transmitting signals utilizing through-chip coupling according to embodiments of the invention. Similarities exist with respect to system 100, in that transmission system 300 includes a first chip 310 and a second chip 320. First chip 310 includes an antenna 312 and a through-chip coupling coil 314. Second chip 320 includes a second through-chip coil 322, a power amplifier 324, a mixer 326, an intermediate frequency automatic gain control circuit 328 and a local oscillation circuit 330. Coils 314 and 322 are substantially aligned about a common axis 350, shown with a dashed line and extending perpendicularly through the two coils. In alternative embodiments, first chip 310 and second chip 320 are coupled by a first coil 314 and a second coil 322 that overlap without being aligned about a common axis. In embodiments, first coil 314 and second coil 322 are not in direct contact with one another.

Antenna 312 is depicted in system 300 as directly coupled to through-chip coupling coil 314. In some embodiments, antenna 312 need not be directly coupled to coil 314 as intermediate components may be present in system 300 without limiting the scope of the present disclosure. For example, though one is not shown, a band-pass filter may be coupled between antenna 312 and through-chip coupling coil 314.

Second chip 320 includes a second through-chip coil 322, as well as components that correspond to a transmission module. Power amplifier 324, mixer 326, intermediate frequency automatic gain control circuit 328, and local oscillation circuit 330 have a dashed line around the collective circuitry to denote a transmission module 340. However, transmission module 340 may include greater or fewer components in various embodiments.

Figure 4:
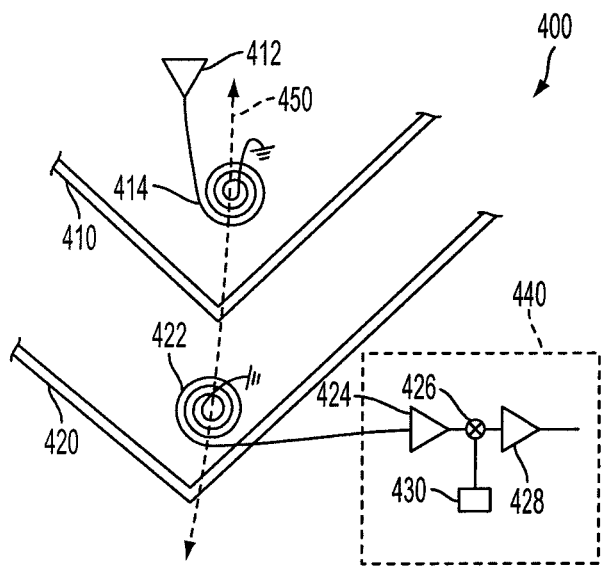
FIG. 4 is a perspective, cross-sectional view of a system for receiving signals utilizing through-chip coupling according to embodiments of the invention.

FIG. 4 is a perspective, cross-sectional view of a system 400 for receiving signals utilizing through-chip coupling according to embodiments of the invention. Reception system 400 includes a first chip 410 and a second chip 420. First chip 410 includes an antenna 412 and a through-chip coupling coil 414. Second chip 420 includes a second through-chip coil 422, a low noise amplifier 424, a mixer 426, an intermediate frequency automatic gain control circuit 428 and a local oscillation circuit 430. Similar to coils 314 and 322 of system 300, coils 414 and 422 are substantially aligned about a common axis 450 in system 400. Axis 450 is shown with a dashed line that extends perpendicularly through coils 414 and 422.

While first chip 410 is shown with an antenna 412 and a through-chip coupling coil 414 only, other components may be included and remain within the scope of the present disclosure. For example, a band-pass filter may be coupled between antenna 412 and coil 414 so that only signals within a certain operational bandwidth are communicated from the antenna to the coil. Exemplary BPFs limit signals between 10 and 100 GHz, 30 and 70 GHz, or 50 and 80 GHz. In alternate embodiments, first chip 410 may be configured with additional components.

Second through-chip coil 422, low noise amplifier 424, mixer 426, intermediate frequency automatic gain control circuit 428, and a local oscillation circuit 430 constitute a reception module 440 on chip 420. Reception module is denoted with a dashed line and may include greater or fewer components in various embodiments. Systems 300 and 400 produce many numerous benefits substantially similar to those described with relation to systems 100 and 200 above.

Figure 5:
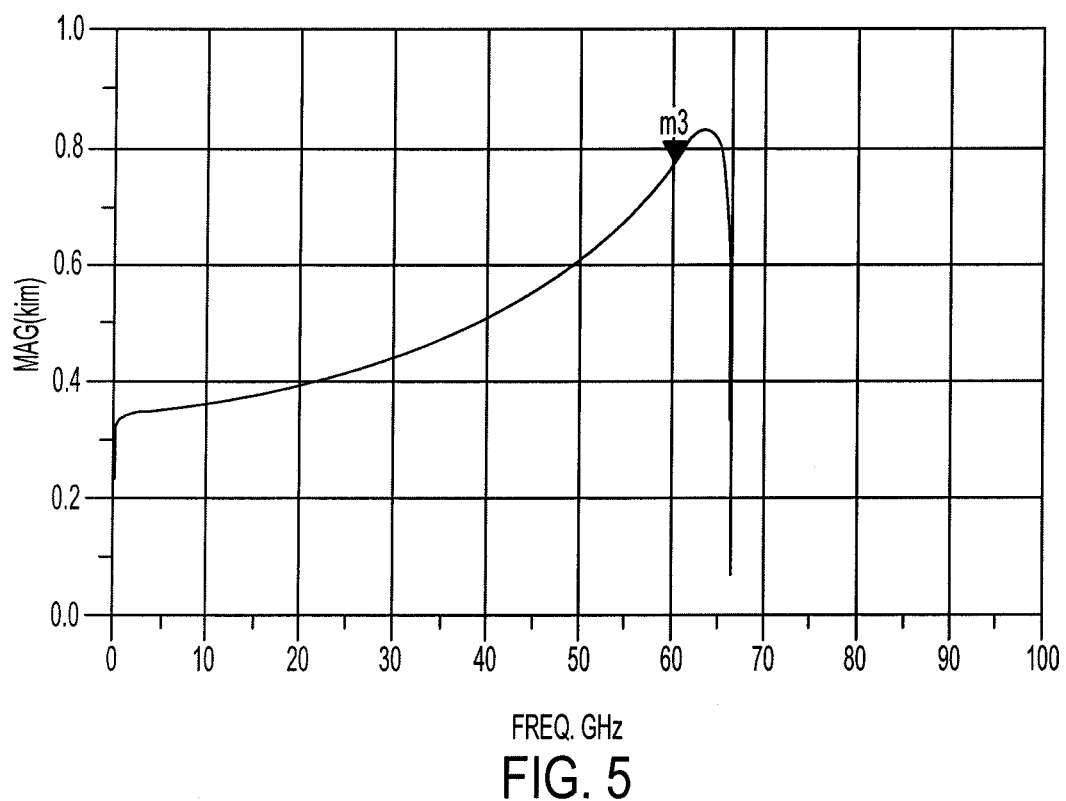
FIG. 5 is a graph of the coupling factor versus frequency of systems according to embodiments of the invention.

FIG. 5 is a graph of the coupling factor versus frequency of systems according to embodiments of the invention. As seen from the graph, as frequency increases, the coupling factor likewise increases. While the coupling factor is relatively low in the lower regions of the graph between 0 and 10 GHz, a somewhat linear increase occurs from about 10 GHz to about 40 GHz. For operating frequencies in excess of 40 GHz, the coupling factor begins to increase more rapidly. Once the operating frequency exceeds about 65 GHz, the coupling factor becomes absolute, resulting in virtually complete transference of the signal from one circuit to the other wirelessly through the aligned coils.

Figure 6:
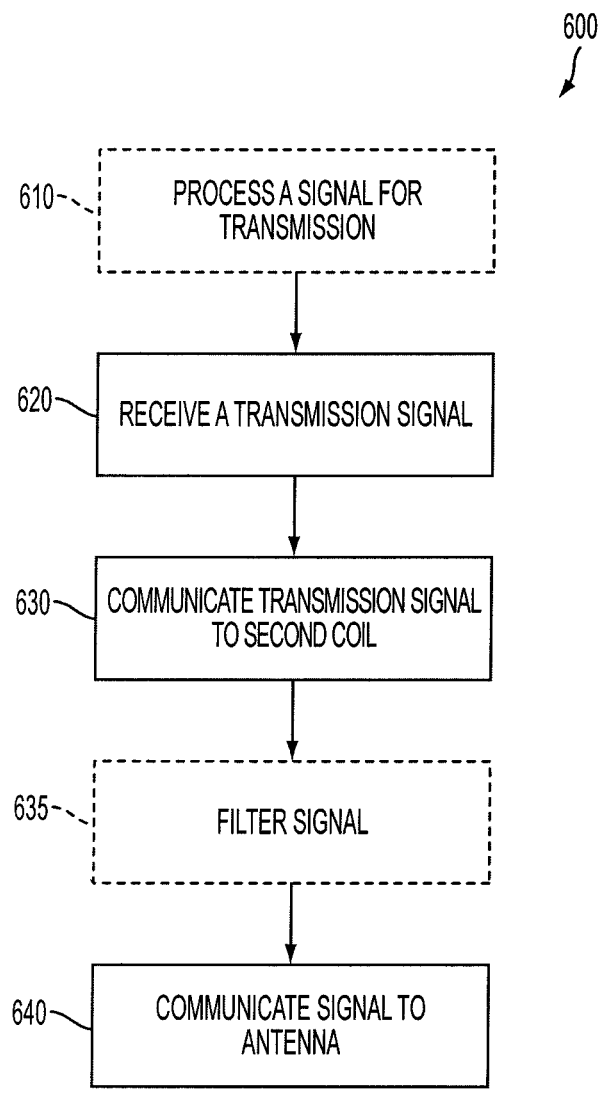
FIG. 6 is a process flow diagram of a method of transmitting a signal from an amplifier circuit to an antenna utilizing through-chip coupling according to embodiments of the invention.

FIG. 6 is a process flow diagram of a method 600 of transmitting a signal from an amplifier circuit to an antenna utilizing through-chip coupling. Method 600 begins with an optional step 610, where a signal for transmission is processed. Processing may include receiving an intermediate frequency automatic gain control signal and a local oscillation signal at a mixer, mixing the intermediate frequency automatic gain control signal and a local oscillation signal at the mixer to form a mixed signal, communicating the mixed signal to a power amplifier, and amplifying the mixed signal at the power amplifier to form a transmission signal. At a step 620, a first coil on a first integrated circuit (IC) chip receives the transmission signal from the processing circuit.

At a step 630, the first coil wirelessly communicates the transmission signal to a second coil on a second IC chip. The first coil and the second coil are not in direct contact, but are coupled to each respective IC chip along a substantially identical axis. At an optional step 635, the transmission signal received from the second coil is filtered prior to supplying the signal to an antenna, thereby supplying a filtered transmission signal to the antenna. A filter defines the operational frequency of the signals to be transmitted. For example, in some embodiments only signals in the millimeter wave band are transmitted. In other embodiments, only signals between 60 GHz and 100 GHz are transmitted. In yet other embodiments, signals between 60 GHz and 70 GHz are transmitted. At a step 640, the second coil communicates the transmission signal or filtered transmission signal to an antenna on the second IC chip.

Figure 7:
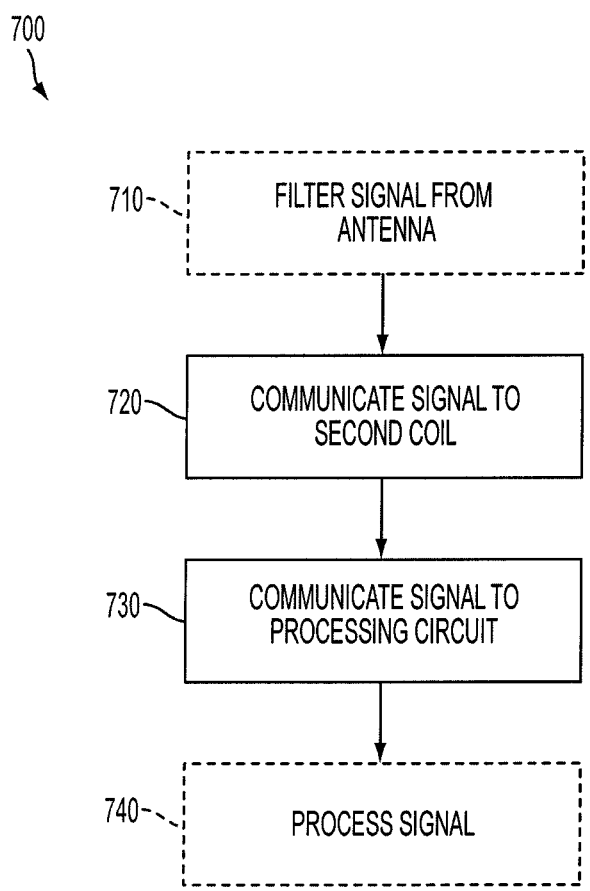
FIG. 7 is a process flow diagram of a method of receiving a signal at an amplifier circuit from an antenna utilizing through-chip coupling according to embodiments of the invention.

FIG. 7 is a process flow diagram of a method 700 of receiving a signal at an amplifier circuit from an antenna utilizing through-chip coupling. Method 700 begins with an optional step 710, where a reception signal received from the antenna is filtered prior to supplying the signal to a first coil, thereby supplying a filtered reception signal to the first coil. The filter defines the operational frequency of the signals to be received. In various embodiments, only signals in the millimeter wave band, signals between 60 GHz and 100 GHz, or signals between 60 GHz and 70 GHz are transmitted. A first coil on a first integrated circuit (IC) chip receives the reception signal or filtered reception signal, and the signal is wirelessly communicated to a second coil on a second IC chip at a step 720. The first coil and the second coil are not in direct contact. The first coil and the second coil are coupled to each respective IC chip along a substantially identical axis.

At a step 730, the recovery signal is communicated to a processing circuit on the second IC chip. At an optional step 740, the processing circuit processes the signal. During processing, a second coil communicates the reception signal to a low noise amplifier. A low noise amplifier amplifies the recovery signal to form an amplified signal. The LNA supplies the amplified signal to a mixer, which also receives a local oscillation signal. The mixer mixes the amplified signal and the LO signal to form a mixed signal. The mixed signal is communicated to an intermediate frequency automatic gain control circuit. The intermediate frequency automatic gain control circuit processes the mixed signal to form a processed signal.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of transmitting a signal from an amplifier circuit to an antenna utilizing through-chip coupling, the method comprising:
at a first coil on a first integrated circuit (IC) chip of a three-dimensional (3D) IC package, receiving a transmission signal from a processing circuit;
wirelessly communicating the transmission signal from the first coil to a second coil on a second IC chip of the 3D IC package, wherein the first coil and the second coil are not in direct contact and wherein the first coil and the second coil vertically overlap, and wherein the first IC chip and the second IC chip form the 3D IC package; and
communicating the transmission signal from the second coil to an antenna on the second IC chip.

2. The method of claim 1, further comprising filtering the transmission signal received from the second coil prior to supplying the signal to the antenna, thereby supplying a filtered transmission signal to the antenna.

3. The method of claim 2, wherein filtering the transmission signal filters signals outside of the millimeter wave band.

4. The method of claim 1, further comprising processing the transmission signal for transmission, wherein processing includes:
mixing a received intermediate frequency automatic gain control signal and a local oscillation signal at a mixer to form a mixed signal; and
amplifying the mixed signal at a power amplifier to form the transmission signal.

5. A method of receiving a signal from an antenna at an amplifier circuit utilizing through-chip coupling, the method comprising:
at a first coil on a first integrated circuit (IC) chip of a three-dimensional (3D) IC package, receiving a reception signal from an antenna;
wirelessly communicating the reception signal from the first coil to a second coil on a second IC chip of the 3D IC package, wherein the first coil and the second coil are not in direct contact, and wherein the first coil and the second coil vertically overlap, and wherein the first IC chip and the second IC chip are bonded to form the 3D IC package; and
communicating the reception signal to a processing circuit on the second IC chip.

6. The method of claim 5, further comprising filtering the reception signal received from the antenna prior to supplying the signal to the first coil, thereby supplying a filtered reception signal to the first coil.

7. The method of claim 6, wherein filtering the reception signal filters signals outside of the millimeter wave band.

8. The method of claim 5, further comprising processing the reception signal upon reception, wherein processing includes:
communicating the reception signal to a low noise amplifier;
amplifying the reception signal at the low noise amplifier to form an amplified signal;
mixing the amplified signal and a local oscillation signal at a mixer to form a mixed signal; and
processing the mixed signal at an intermediate frequency automatic gain control circuit to form a processed signal.

9. An interface for through-chip coupling of an antenna and an analog amplifier circuit, the interface comprising:
a first coil on a first integrated circuit (IC) chip, wherein the first coil is coupled to an antenna; and
a second coil on a second IC chip, wherein the second coil is not in direct contact with the first coil, wherein the second coil is coupled to a first amplifier circuit, and wherein the first coil and the second coil are wirelessly communicable with each other to communicatively transmit signals between the antenna and the first amplifier circuit, wherein the first coil and the second coil vertically overlap, and wherein the first chip and the second chip define a three-dimensional (3D) IC package, and wherein the first IC chip and the second IC chip are bonded to form the 3D IC package.

10. The interface of claim 9, further comprising a bandpass filter coupled between the antenna and the first coil.

11. The interface of claim 10, wherein the first amplifier circuit includes a power amplifier.

12. The interface of claim 11, further comprising:
a local oscillation circuit;
an intermediate frequency automatic gain control circuit; and
a mixer configured to receive signals from the local oscillation circuit and the intermediate frequency automatic gain control circuit to form a mixed output and further configured to supply the mixed output to the power amplifier.

13. The interface of claim 10, wherein the first amplifier circuit includes a low noise amplifier.

14. The interface of claim 13, further comprising:
a local oscillation circuit;
a mixer configured to receive signals from the local oscillation circuit and the low noise amplifier to form a mixed output; and
an intermediate frequency automatic gain control circuit configured to receive the mixed output from the mixer.

15. The interface of claim 9, wherein the first amplifier circuit is configured to operate a circuit in the millimeter wave band.

16. The interface of claim 15, wherein the first amplifier circuit is configured to operate over a bandwidth range of the millimeter wave band so as to reduce the inductance between the first coil and the second coil.

17. The interface of claim 15, wherein the first amplifier circuit is configured to operate between about 30 GHz and about 100 GHz.

18. The interface of claim 15, wherein the first amplifier circuit is configured to operate between about 60 GHz and about 70 GHz.

19. The interface of claim 9, wherein the second coil is coupled to a second amplifier circuit, whereby the first amplifier circuit and the second amplifier circuit are configured to enable both reception and transmission of signals.

20. The interface of claim 9, wherein the first coil and the second coil are axially aligned about a common axis.

21. The interface of claim 9, wherein each of the first chip and the second chip includes a semiconductor material.

22. The interface of claim 21, wherein the semiconductor material comprises at least one of silicon, germanium, or gallium.

* * * * *